(12) United States Patent
Breynaert et al.

(10) Patent No.: US 6,707,183 B2
(45) Date of Patent: Mar. 16, 2004

(54) CONNECTOR WITH FLUX CONCENTRATOR FOR ELECTRIC MOTOR AND CORRESPONDING GEARED MOTOR

(75) Inventors: François Breynaert, Caen (FR); Jérôme Quere, Bieville-Beuville (FR)

(73) Assignee: Meritor Light Vehicle Systems-France (FR)

( * ) Notice: Subject to any disclaimer, the term of this patent is extended or adjusted under 35 U.S.C. 154(b) by 0 days.

(21) Appl. No.: 09/833,865

(22) Filed: Apr. 12, 2001

(65) Prior Publication Data

US 2002/0016087 A1 Feb. 7, 2002

(30) Foreign Application Priority Data

Apr. 14, 2000 (FR) .............................. 00 04870

(51) Int. Cl.[7] ................................................ H02K 7/00
(52) U.S. Cl. .................... 310/68 B; 310/71; 324/207.2; 324/207.25
(58) Field of Search ................................. 310/68 B, 71, 310/68 R; 324/207.17, 207.2, 207.25, 173, 174

(56) References Cited

U.S. PATENT DOCUMENTS

| | | | | | |
|---|---|---|---|---|---|
| 4,115,715 A | * | 9/1978 | Muller | ................ | 310/156.05 |
| 4,547,714 A | * | 10/1985 | Muller | ................ | 310/68 R |
| 5,453,649 A | * | 9/1995 | Blanchet | ............ | 310/71 |
| 5,811,968 A | * | 9/1998 | Nakazawa et al. | ... | 123/617 |
| 6,016,055 A | * | 1/2000 | Jager et al. | ...... | 324/165 |
| 6,043,576 A | * | 3/2000 | Weber et al. | ..... | 310/68 B |
| 6,107,713 A | * | 8/2000 | Hulsmann et al. | . | 310/112 |
| 6,127,752 A | * | 10/2000 | Wiesler | ............ | 310/238 |
| 6,317,332 B1 | * | 11/2001 | Weber et al. | ...... | 310/71 |
| 6,373,241 B1 | * | 4/2002 | Weber et al. | ..... | 310/68 B |

FOREIGN PATENT DOCUMENTS

| | | |
|---|---|---|
| DE | 42 18 793 | 9/1993 |
| JP | 2001-359255 | * 12/2001 |
| WO | WO 98/27640 | 6/1998 |
| WO | WO 99/13341 | 3/1999 |

OTHER PUBLICATIONS

Preliminary Sear ch Report dated Nov. 23, 2000 for France Application 0004870.

* cited by examiner

*Primary Examiner*—Dang Le
(74) *Attorney, Agent, or Firm*—Carlson, Gaskey & Olds

(57) ABSTRACT

A motor includes a magnetic ring which is the seat of a magnetic field related to operating parameters of the motor. A connector for the motor includes a magnetic flux conduction member forming a flux concentrator interposed, when the connector is fixed on the motor, between the magnetic ring and a Hall-effect sensor adapted so as to measure the magnetic flux the magnetic flux conduction member. Application to geared motors for window-raising systems, seat actuation systems or sunroof systems, in the automobile sector.

16 Claims, 3 Drawing Sheets

CONNECTOR WITH FLUX CONCENTRATOR FOR ELECTRIC MOTOR AND CORRESPONDING GEARED MOTOR

BACKGROUND OF THE INVENTION

The present invention concerns the domain of electric motors, in particular geared motors for automobile accessories, which are used for example in window-raising systems, seat actuation systems or sunroof systems.

The invention is more precisely aimed at a connector for electric motor, adapted so as to be fixed on said motor, said motor comprising a magnetic ring which is the seat of a magnetic field related to operating parameters of the motor.

The motors or geared motors to which the invention applies are associated with a control system which uses motor speed and/or position parameters. These parameters are fed to the control system by a Hall-effect sensor associated with the magnetic ring, which is adapted so as to deliver to the sensor a magnetic field dependant on the speed and/or position of the motor shaft.

Generally, the electronic control devices of such motors or geared motors comprise an electronic board secured to the casing of the motor, said board comprising motor electrical supply connections and the Hall-effect sensor. This sensor is fixed on a board part formed of a rigid strip penetrating the casing of the motor as far as a zone neighboring the magnetic ring, in such a way that the sensor is located in the vicinity of said ring.

It is understood that the presence of such an electronic control module on the casing of the motor is incompatible with a high degree of standardization of motors, since such a configuration of the motor and of its casing is not suited to an application in which the speed and/or position sensor is dispensed with, and in which the electronic control device of the motor is located off-site some distance away from the motor.

SUMMARY OF INVENTION

A main aim of the invention is to remedy this drawback, and to propose a connector for electric motor, which makes it possible to transport information of magnetic type to an electronic processing device and is capable of amalgamating with this function the conventional functions for the electrical supply of the motor.

With this aim, a connector according to the invention comprises at least one magnetic flux conduction member forming a flux concentrator interposed, when the connector is fixed on the motor, between the magnetic ring and a Hall-effect sensor adapted so as to measure the magnetic flux conducted by the magnetic flux conduction member.

The invention is also aimed at a geared motor for automobile accessories, such as a window or a seat, comprising a rotor shaft equipped with a magnetic ring, characterized in that it comprises a connector as described above.

BRIEF DESCRIPTION OF DRAWINGS

Exemplary embodiments of the invention will now be described with regard to the appended drawings, in which.

DETAILED DESCRIPTION OF THE PREFERRED EMBODIMENTS

Figure 1:
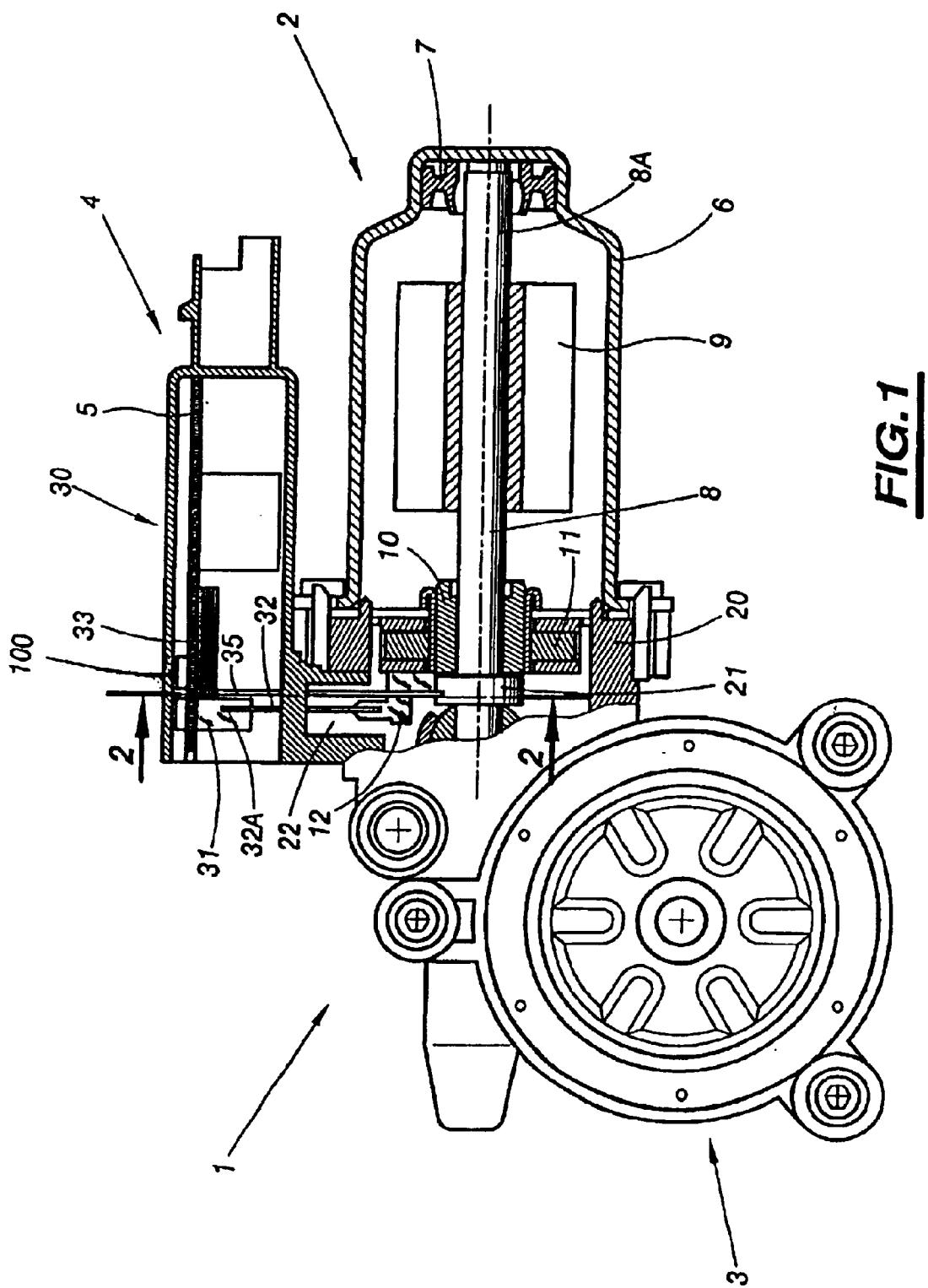
FIG. 1 is an end-on view in partial section of a geared motor equipped with a connector according to a first embodiment of the invention.

Represented in FIG. 1 is a geared motor 1 essentially consisting of a motor 2 and of a reduction gear 3, the motor 2 being equipped with an electronic control device 4 which comprises a printed circuit board 5.

The motor 2 comprises a stator 6 forming a shroud in which are housed permanent magnets (not represented), and supporting by way of a bearing 7 an end 8A of a shaft 8 of a rotor 9. In a known manner, the latter comprises windings coiled around stacked laminations. A commutator 10 is linked electrically to the rotor 9 and receives by way of brushes 1 the motor supply current transmitted to said motor at the level of supply lugs 12.

The geared motor 1 moreover comprises a casing 20 rigidly fixed to the stator 6 and supporting by way of a second bearing assembly, not represented, the second end of the rotor shaft 8. The rotor shaft span situated on the same side as this second shaft end is configured as a threaded rod forming a worm screw, which drives a set of gears of the reduction gear 3.

A magnetic ring 21 is fixed on the rotor shaft 8 in a region neighboring the supply lugs 12.

The casing 20 exhibits an aperture 22 in proximity to the supply lugs 12, which aperture is adapted so as to receive in a detachable manner an electrical connector 30 into which the printed circuit board 5 of the electronic control device 4 is fixed. This board supports an electronic circuit 100 able to deliver a supply current for the motor. The connector 30 is held in position by releasable fastening means of conventional type (not represented). The current delivered by the electronic circuit 100 travels through power tags 31 secured to the printed circuit board 5, each of said tags 31 being connected fixedly to an end 32A of a contact 32 of "stirrup" type, that is to say a contact one end of which consists of an elastic clip having two inwardly arched symmetric contact portions.

The printed circuit board 5 additionally supports a Hall-effect sensor 33 intended to receive a magnetic flux indicative of the speed and/or position of the rotor shaft 8 and to transmit to the electronic control device 4 an electrical signal indicative of these operating parameters of the motor.

The connector 30 also comprises a magnetic flux conduction member 35 consisting, in the variant of the invention represented in FIG. 1, of two parallel metal pins, one end of which is fixed to the printed circuit board 5 in the vicinity of the Hall-effect sensor 33. The other end 35A constituting the free end of the pin 35 is situated, when the connector 30 is inserted into the aperture 22 of the corresponding casing 20 and held by the fastening means, in proximity to the periphery of the magnetic ring 21. The two free preferably disposed symmetrically respect to an axial plane P of the magnetic ring 21.

Figure 2:
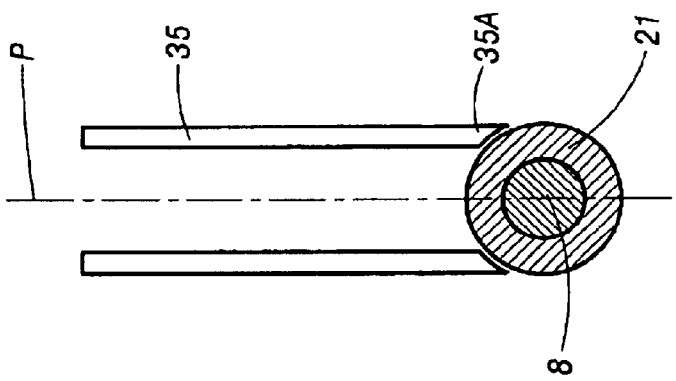
FIG. 2 is a diagrammatic cross section along the line 2—2 of FIG. 1 representing the magnetic flux conduction member and the magnetic ring.

The relative position of the metal pins 35 and of the magnetic ring 21 is more clearly apparent in FIG. 2. The magnetic ring 21 generates a magnetic field of constant strength whose direction varies with the angular position of the rotor shaft 8, and therefore the magnetic flux conducted by the pins 35 of the magnetic ring 21 to the Hall-effect sensor 33 is dependent on the angular position of the rotor shaft 8. The electrical signal delivered by the Hall-effect sensor 33 therefore affords access to the speed and/or angular position of the rotor shaft 8.

Preferably, the pins 35 forming magnetic flux conduction members are made of steel.

Figure 3:
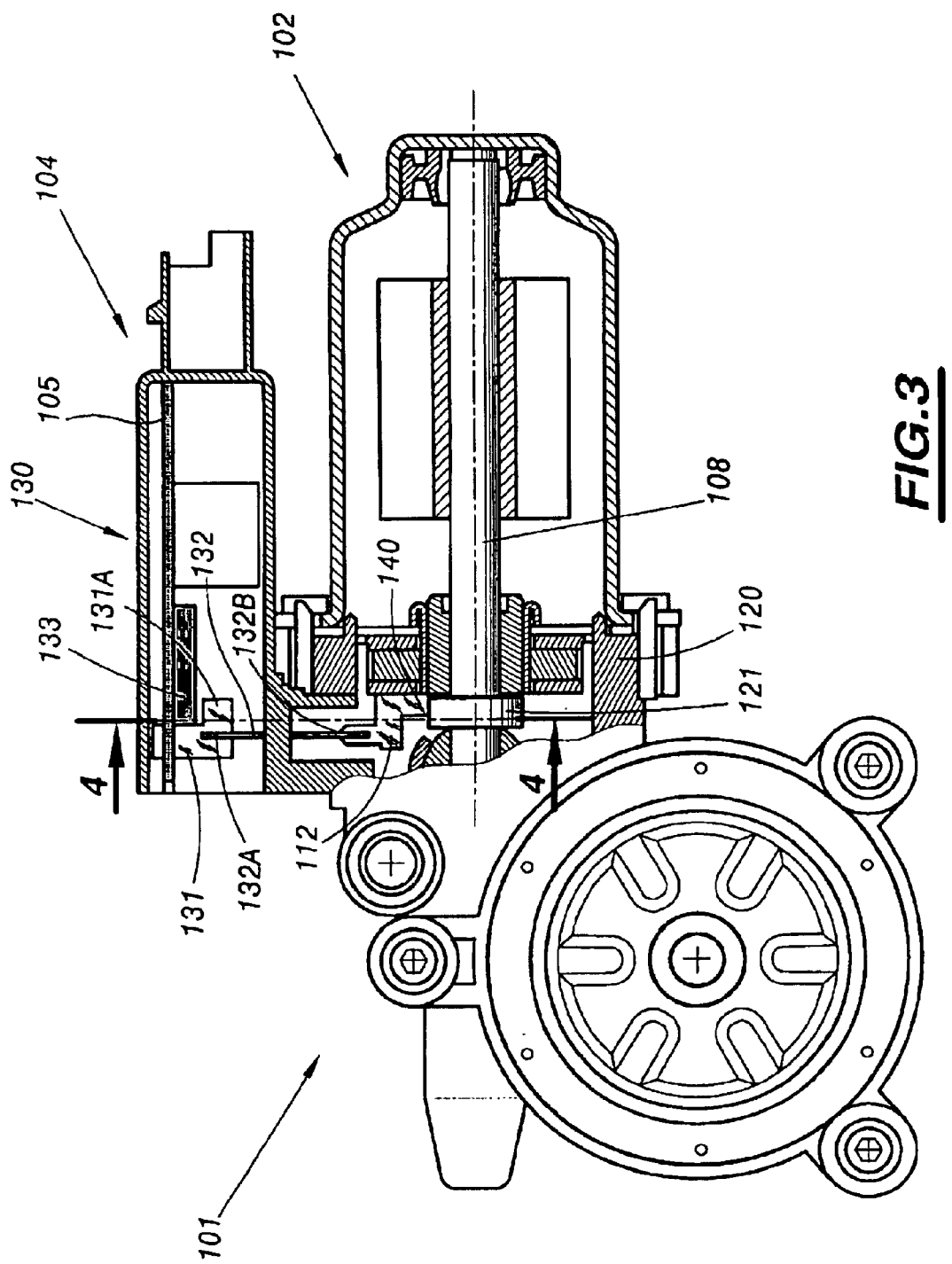
FIG. 3 is a view similar to FIG. 1 according to a second embodiment of the invention.

Represented in FIG. 3 is a geared motor 101 of the same type as above, whose motor 102 comprises a rotor shaft 108 on which a magnetic ring 121 is fixedly mounted. A connector 130 comprises a printed circuit board 105 forming part of an electronic control device 104 of the electric motor 102 and supporting a pair of supply tags 131 situated in proximity to a Hall-effect sensor 133. The connector is fixed in a detachable manner to the casing 120 of the geared motor 101 by conventional releasable fastening means (not represented). The connector 130 comprises contacts 132 of "stirrup" type, fixed by one of their ends 132A to the tags 131 and intended to be connected by their second end 132B to motor supply lugs 112.

Figure 4:
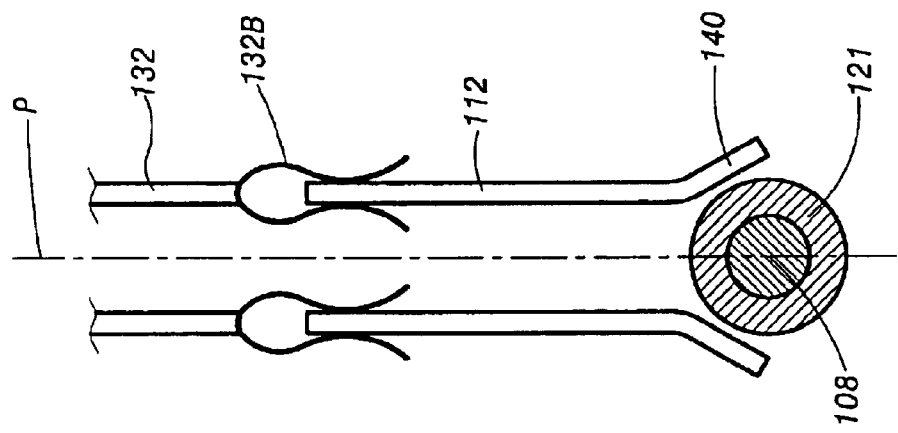
FIG. 4 is a cross section similar to FIG. 2, along the line 4—4 of FIG. 3.

In this variant of the invention, and as will be more clearly seen in FIG. 4, the two lugs 112 each exhibit a part 140 overlapping the magnetic ring 121, oblique with respect to the direction of coupling of the contacts 132, and which lies in the vicinity of the magnetic ring 121 in an almost tangential manner. These two parts 140 are preferably symmetric with respect to the axial plane P of the ring 121. Likewise, the tags 131 comprise a part 131A partially overlapping the Hall-effect sensor 133, so that the lugs 112, the contacts 132 and the tags 131 fulfill the flux concentrator function and constitute a member for conducting the magnetic flux of the magnetic ring 121 to the Hall-effect sensor 133.

Preferably, the contacts 132 are made of steel, a material of this type offering an acceptable compromise between the qualities of electrical and magnetic conduction, and exhibiting excellent mechanical properties.

It is readily understood that the two variants of the invention which have just been described make it possible to design geared motors with a high degree of standardization. Specifically, it is not necessary to secure a printed circuit board carrying a Hall-effect sensor to the motor in order to achieve the position and/or speed sensor functions, and hence to modify the casing of a standard motor. Thus, one and the same motor can be used regardless of the application of the geared motor, and regardless of the type of sensor required (speed/position), only the connector having to be modified.

The invention, which makes it possible to conduct magnetic information to an offsite sensor, renders a single geared motor configuration adaptable to various applications, the standardization of the geared motor being offset by the diversification of the connection engineering, thereby achieving a considerable saving with regard to the complete system.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A connector adapted to be detachably fixed on an electric motor including a magnetic ring which is a seat of a magnetic field related to operating parameters of said motor, the connector comprising:
   a magnetic flux conduction member forming a flux concentrator;
   a Hall-effect sensor adapted to measure magnetic flux conducted by said magnetic flux conduction member; and
   a printed circuit board having an electrical circuit adapted to supply current for said motor fixed thereon, wherein the magnetic flux conduction member is fixed to the printed circuit board in the vicinity of the Hall-effect sensor, and wherein the magnetic flux conduction member is releasably interposed between said magnetic ring and the Hall-effect sensor when said connector is fixed on the motor.

2. The connector for an electric motor as recited in claim 1, wherein said magnetic flux conduction member comprises at least one metal pin having a portion that lies in a vicinity of said magnetic ring when said connector is fixed on said motor.

3. The connector for an electric motor as recited in claim 2, wherein said magnetic flux conduction member comprises two metal pins having free ends disposed symmetrically with respect to an axial plane of said magnetic ring.

4. The connector as recited in claim 3 wherein said two metal pins are made of steel.

5. The connector as recited in claim 3 wherein said two metal pins are parallel.

6. The connector for an electric motor as recited in claim 1, further comprising at least two electrical power contacts linked to said electrical circuit for said motor.

7. The connector for an electric motor as recited in claim 6, wherein at least one of said electrical power contacts is disposed so as to constitute a part of said magnetic flux conduction member.

8. The connector for an electric motor as recited in claim 7, wherein said power contact constituting a part of said magnetic flux conduction member is connected, when said connector is fixed on said motor, to a metal pad secured to said motor and a part of which lies in a vicinity of said magnetic ring.

9. The connector for an electric motor as recited in claim 7, wherein said power contact constituting a part of said magnet flux conduction member is made of steel.

10. The connector as recited in claim 4 wherein said electrical power contacts include an end, and a metal pad is inserted into said end of each of said electrical power contacts which overlap said magnetic ring.

11. The connector for an electric motor as recited in claim 1, wherein said connector is secured to said printed circuit on which said Hall-effect sensor is disposed.

12. The connector for an electric motor as recited in claim 1, wherein said connector is adapted so as to be fixed in a detachable manner on said electric motor.

13. A geared motor for an automobile accessories comprising a connector adapted to be detachably fixed on an electric motor including a magnetic ring which is a seat of a magnetic field related to operating parameters of said motor, the connector comprising:
   a magnetic flux conduction member forming a flux concentrator;
   a Hall-effect sensor adapted to measure magnetic flux conducted by said magnetic flux conduction member; and a printed circuit board having an electrical circuit adapted to supply current for said motor fixed thereon, wherein the magnetic flux conduction member is fixed to the printed circuit board in the vicinity of the Hall-effect sensor, and wherein the magnetic flux conduction member is releasably interposed between said magnetic ring and the Hall-effect sensor when said connector is fixed on the motor.

14. The geared motor as recited in claim 13 wherein said automobile accessory is a window.

15. The geared motor as recited in claim 3 wherein said automobile accessory is a seat.

16. The geared motor as recited in claim 3 wherein said automobile accessory is a sunroof.

* * * * *

UNITED STATES PATENT AND TRADEMARK OFFICE
CERTIFICATE OF CORRECTION

PATENT NO.   : 6,707,183 B2
DATED        : March 16, 2004
INVENTOR(S)  : Breynaert et al.

It is certified that error appears in the above-identified patent and that said Letters Patent is hereby corrected as shown below:

Column 6,
Line 3, "claim 3" should read as -- claim 13 --
Line 5, "claim 3" should read as -- claim 13 --

Signed and Sealed this

Seventeenth Day of May, 2005

JON W. DUDAS
*Director of the United States Patent and Trademark Office*